Nov. 13, 1951 — W. E. MENZIES — 2,574,650
CROSS-CONNECTED ARMATURE
Filed Sept. 20, 1949 — 2 SHEETS—SHEET 1

INVENTOR
WILLIAM E. MENZIES
BY Spencer, Hardman & Fehr
HIS ATTORNEYS

Nov. 13, 1951 W. E. MENZIES 2,574,650
CROSS-CONNECTED ARMATURE

Filed Sept. 20, 1949 2 SHEETS—SHEET 2

12 Poles
12 Paths
28 Slots
84 Bars And Coils
Chorded ⅓ Slot

INVENTOR
WILLIAM E. MENZIES
BY Spencer, Hardman and Fehr
HIS ATTORNEYS

Patented Nov. 13, 1951

2,574,650

UNITED STATES PATENT OFFICE 2,574,650

CROSS-CONNECTED ARMATURE

William E. Menzies, Dayton, Ohio, assignor to General Motors Corporation, Detroit, Mich., a corporation of Delaware Application September 20, 1949, Serial No. 116,711

3 Claims. (Cl. 171—252)

This invention relates to improved armature windings of electric machines.

It is among the objects of the present invention to provide a direct current electric machine with improved armature windings which increase the efficiency of the machine and provides the following advantages:

(1) Higher ratings inasmuch as losses due to circulating currents are substantially eliminated.

(2) Interconnecting ties are of comparatively small cross section, facilitating attachment and requiring minimum space.

(3) Rendering it possible to utilize the same armature segments for either high or low voltage windings (simplex and multiplex). This is generally avoided with wave and lap windings. It will be noted that the four pole winding illustrated, has an odd number of slots which would render the application of a lap winding impossible.

(4) Instead of being limited to either two parallel paths or a number of paths equal to the number of poles or multiples thereof as is customary in lap windings, the present invention provides for additional numbers of paths, particularly in machines having more than four poles. For example 2, 4 and 6 paths in a 6 pole machine and 2, 4, 6 and 8 paths in an 8 pole machine and so forth.

Further objects and advantages of the present invention will be apparent from the following description, reference being had to the accompanying drawings wherein a preferred embodiment of the present invention is clearly shown.

When it becomes advisable to employ multiple paths in armature windings, it is customary to use parallel or lap windings with equalizer connections. These connections join in parallel, coils lying in similar positions under different poles. If the poles are not of the same magnetic strength, circulating currents will flow in the equalizer connections and the armature winding to bring all poles to approximately the same magnetic strength. Without these connections, voltages at brush arms of like polarity will tend to vary with the magnetic strengths of the poles and circulating currents will flow in the brush-arm connectors and brushes with attendant sparking.

In a wave or series winding, the voltage generated is dependent upon the average magnetic strength of all poles and there is therefore no need of equalizers. Furthermore, the individual coils of the windings, by being disposed so that they connect portions of the commutator that are spaced approximately the span of brush arms of like polarity, serve to insure equal potentials under brush arms of like polarity.

The circuits of multiplex windings tend to perform independently of each other since they are connected in parallel only through the brush surfaces. By properly electrically tying together the circuits of a multiplex wave winding, this difficulty is overcome, the entire winding performs as a unit and a commutation is obtained that is as good as that of a comparable lap winding with equalizers.

Figure 1:
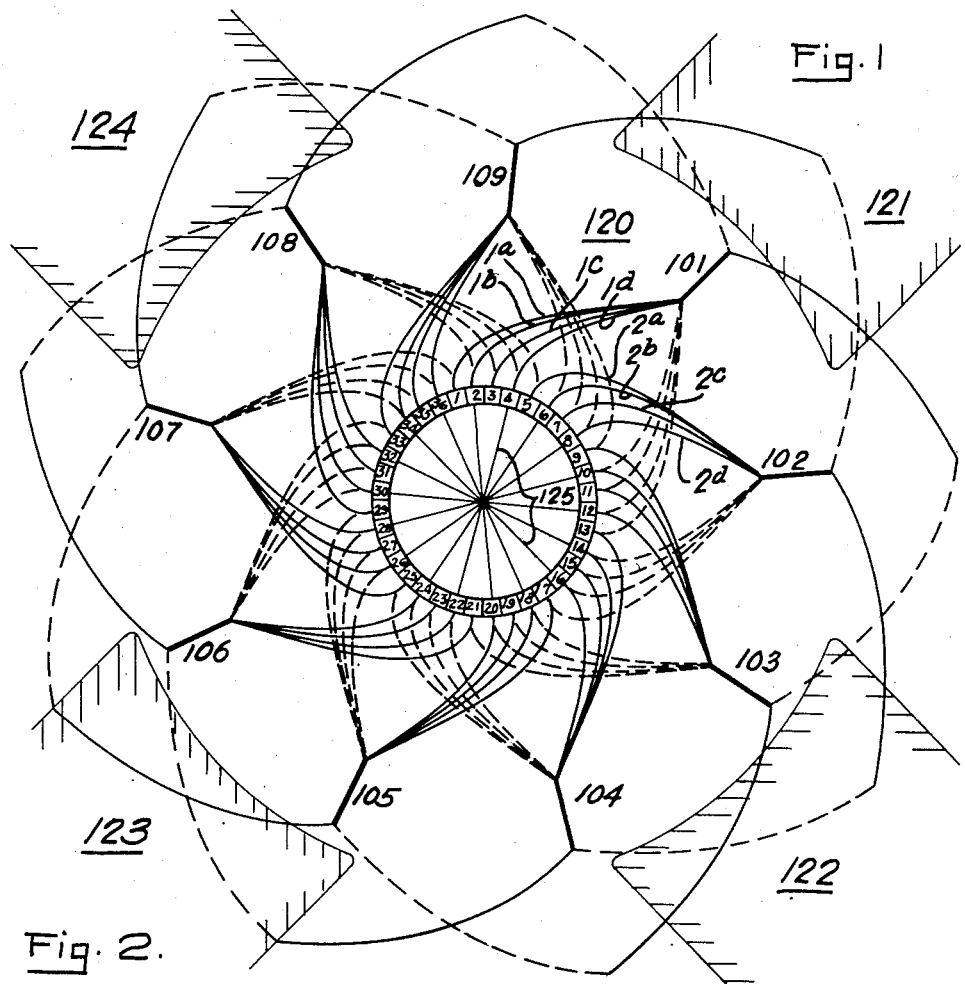
Fig. 1 is a winding diagram of a wave wound, duplex, doubly reentrant armature for a four pole electric machine.
Figure 2:
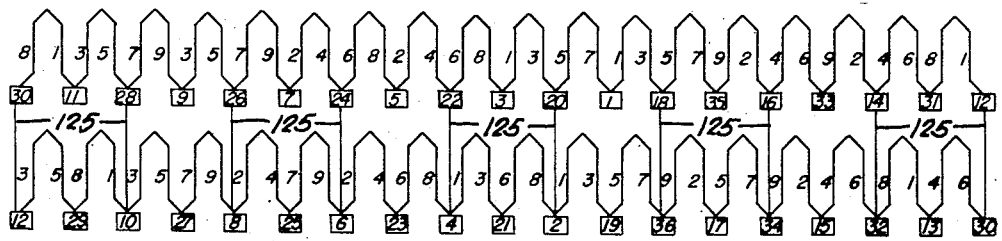
Fig. 2 is a line diagram of the same armature.

Referring to the drawings and particularly to Fig. 1, the numeral 120 designates a wave wound, duplex, doubly entrant armature winding for a four pole electric machine. These poles are designated by the numerals 121, 122, 123 and 124. The armature has 9 slots, designated by the numerals 101 to 109 inclusive, 4 coils per slot, 1a, 1b, 1c and 1d respectively, for slot 101; 2a, 2b, 2c and 2d respectively for slot 102 and so forth. The armature shown has 36 coils and commutator bars. The radial lines 125, shown within the circle of commutator bars, represent the ties, each tie connecting diametrically opposite bars. In the line diagram Fig. 2, each coil side is given the unit number of the slot in which it is located. The commutator bars are numbered 1 to 36 respectively in their circular arrangement in Fig. 1 and in line arrangement in Fig. 2. The connecting ties 125 appear as vertical lines in Fig. 2 each connecting opposite bars having even numbers as references. The line diagram clearly shows that the closed loops formed by the ties respectively embrace a group of two coils in the upper portion of the loop, which lie in the same slots as the corresponding two coils in the lower half of the loop. For example, ties between bars 2 and 20 and 4 and 22 form a closed loop embracing coils with sides 1 and 3, and 6 and 8 in the upper half and coils with sides 1 and 3, and 6 and 8 in the lower half of the diagram. From the slot sequence, it is obvious that the coils in the loop are in voltage opposition and thus there can be no circulating current. Only a predetermined arrangement of ties brings about this balanced condition. When the odd numbered bars or any combination of odd and even numbered bars, as illustrated, are electrically tied together, circulating current flows result.

Figure 3:
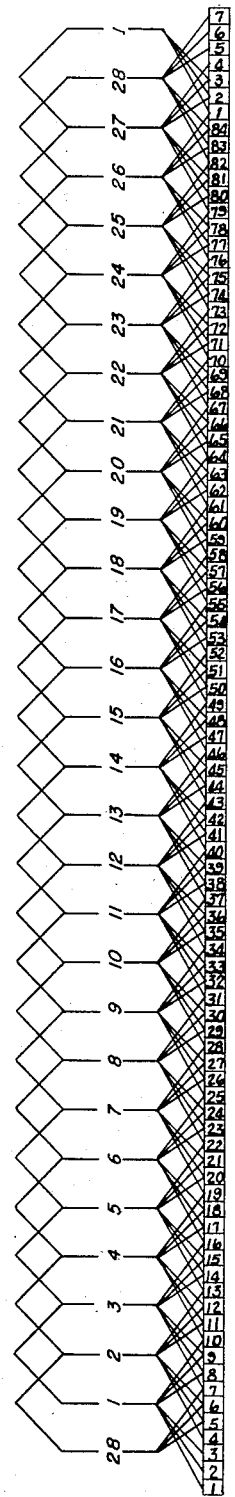
Fig. 3 is a diagrammatic view of a developed armature winding for a 12 pole armature.
Figure 4:
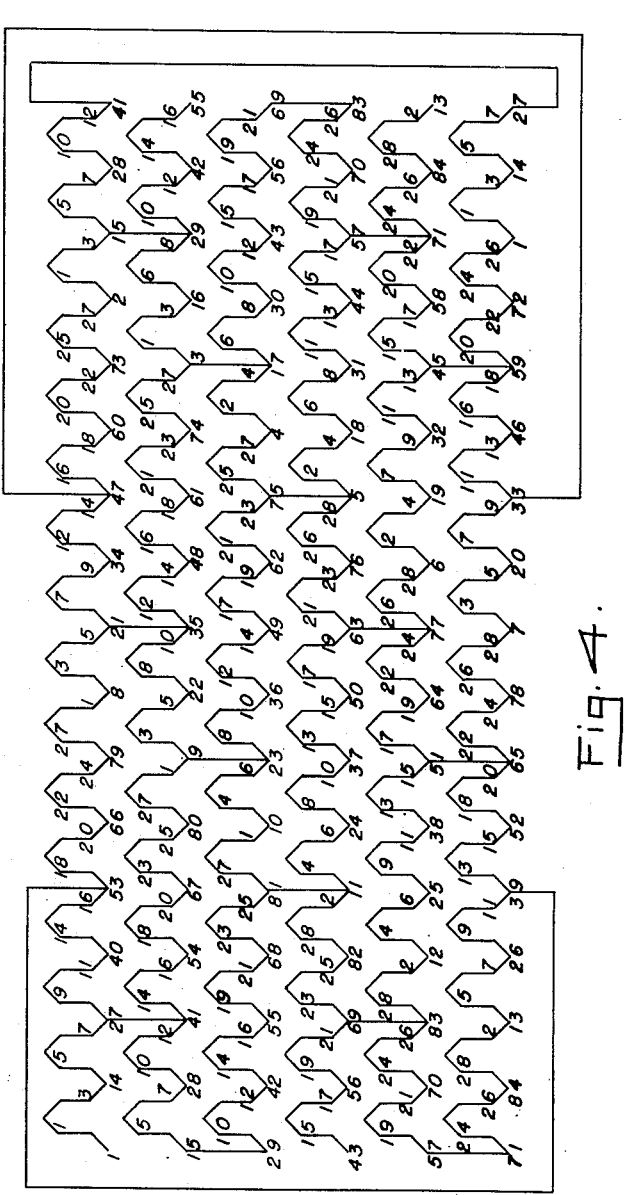
Fig. 4 is a line diagram of the device illustrated by Fig. 3.

The particular arrangement of winding shown was chosen for purposes of illustrating the principle involved. Other combinations of slots per pole and coils per slot may be employed as well as a greater number of poles or a greater number of parallel paths in the windings. This is illustrated by the Figs. 3 and 4. The Fig. 3 is a development of an armature winding for a twelve pole electric machine and the Fig. 4 is a line diagram showing the individual coils of the device in Fig. 3, the manner in which they are connected, the slots, 28 in number, in which they lie, the numbers of the commutator bars 1 to 84, to which said windings or coils are connected and the ties 1 to 28, designated by the straight vertical lines in Figs. 3 and 4, which ties join equipotential points on the winding. (Additional ties may be used, if desired.)

While the embodiment of the present invention as herein disclosed, constitutes a preferred form, it is to be understood that other forms might be adopted, all coming within the scope of the claims which follow.

What is claimed is as follows:

1. An armature for a direct current dynamo, said armature having a multiple-circuit wave winding; electrical ties joining selected equipotential points on circuits of said winding forming closed loops comprising voltage generating elements of said winding in which pairs of said voltage generating elements in each loop, due to the selection of proper equipotential points joined by said ties, are located in substantially the same region around the armature and are in voltage opposition in the loop whereby the voltage in the loops and consequently current in the ties is substantially zero.

2. An armature for a direct current dynamo, said armature having a multiple circuit wave winding, electrical ties joining selected equipotential points on circuits of said winding, the successive selected points of attachment of ties between any two circuits having interposed in each circuit a number of active coils equal to the number of pairs of poles or multiples thereof and due to the selection of proper equipotential points joined by said ties, voltages in the network formed by said ties are substantially balanced and consequently the current in the ties is substantially zero.

3. An armature for a direct current dynamo, said armature having a multiple-circuit wave winding, electrical ties joining selected equipotential points on circuits of said winding, said tie connections being points on the commutator, the span of said ties being substantially the span of brush arms of like polarity or multiples thereof and due to the selection of proper equipotential points joined by said ties, voltages in the network formed by said ties are substantially balanced and consequently the current in the ties is substantially zero.

WILLIAM E. MENZIES.

REFERENCES CITED

The following references are of record in the file of this patent:

UNITED STATES PATENTS

| Number | Name | Date |
|---|---|---|
| 783,498 | Arnold et al. | Feb. 28, 1905 |
| 820,997 | Steinmetz | May 22, 1906 |